United States Patent [19]
Wolrich et al.

[11] Patent Number: 4,811,272
[45] Date of Patent: Mar. 7, 1989

[54] APPARATUS AND METHOD FOR AN EXTENDED ARITHMETIC LOGIC UNIT FOR EXPEDITING SELECTED FLOATING POINT OPERATIONS

[75] Inventors: Gilbert M. Wolrich, Framingham; Edward J. McLellan, Milford; Robert A. J. Yodlowski, Hudson; Roy W. Badeau, Berlin; John A. Kowaleski, Jr., Hudson, all of Mass.

[73] Assignee: Digital Equipment Corporation, Maynard, Mass.

[21] Appl. No.: 50,748

[22] Filed: May 15, 1987

[51] Int. Cl.$^4$ ............................................. G06F 7/50
[52] U.S. Cl. ................................. 364/788; 364/748; 364/768
[58] Field of Search .............. 364/748, 715, 788, 769, 364/768

[56] References Cited

U.S. PATENT DOCUMENTS

| | | | |
|---|---|---|---|
| 3,814,925 | 6/1974 | Spannagel | 364/748 X |
| 4,366,548 | 12/1982 | Kregness et al. | 364/748 |
| 4,573,137 | 2/1986 | Ohhashi | 364/788 |
| 4,682,303 | 7/1987 | Uya | 364/788 |

OTHER PUBLICATIONS

Earle et al., "Exponent Differences and Preshifter", IBM Tech. Disclosure Bulletin, vol. 9, No. 7, Dec. 1966, pp. 848-849.
Mead et al., "Introduction to VLSI Systems", Addison-Wesley Publishing Comp., 1980, pp. 150-154.

Primary Examiner—Gary V. Harkcom
Assistant Examiner—Tan V. Mai
Attorney, Agent, or Firm—William W. Holloway; William C. Cray

[57] ABSTRACT

Apparatus and method for expediting the alignment of the fraction portion of operands in floating point operations. The alignment is performed in the arthmetic logic unit where the argument of the operand A exponent is subtracted from the argument of the operand B exponent. Because the result B−A can be a negative quantity, the result A−B can also be required. The arthmetic logic unit of the present invention provides additional apparatus for simultaneously determining B−A and A−B. The additional apparatus includes components in the propagate bit and generate bit cell for determining an auxiliary generate bit; an additional carry-chain array for combining the carry-in signal, the propagate bit and the auxiliary generate bit; and selection circuits for selecting the appropriate result.

17 Claims, 4 Drawing Sheets

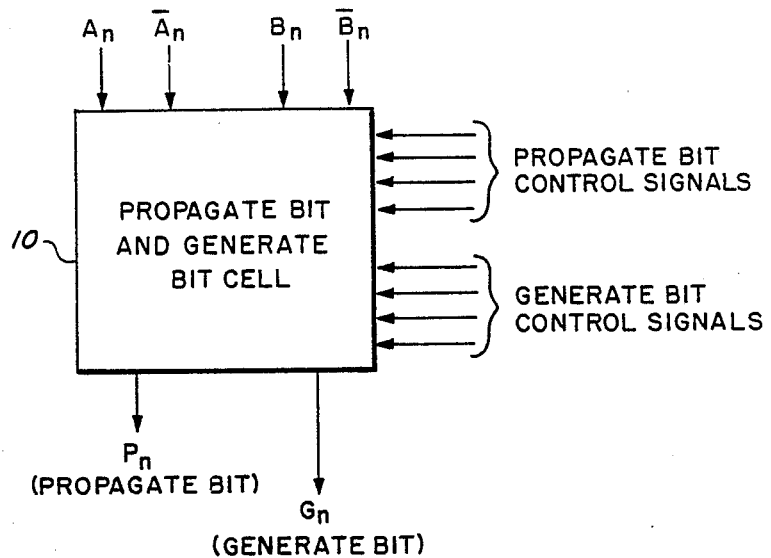
*FIG. IA.*
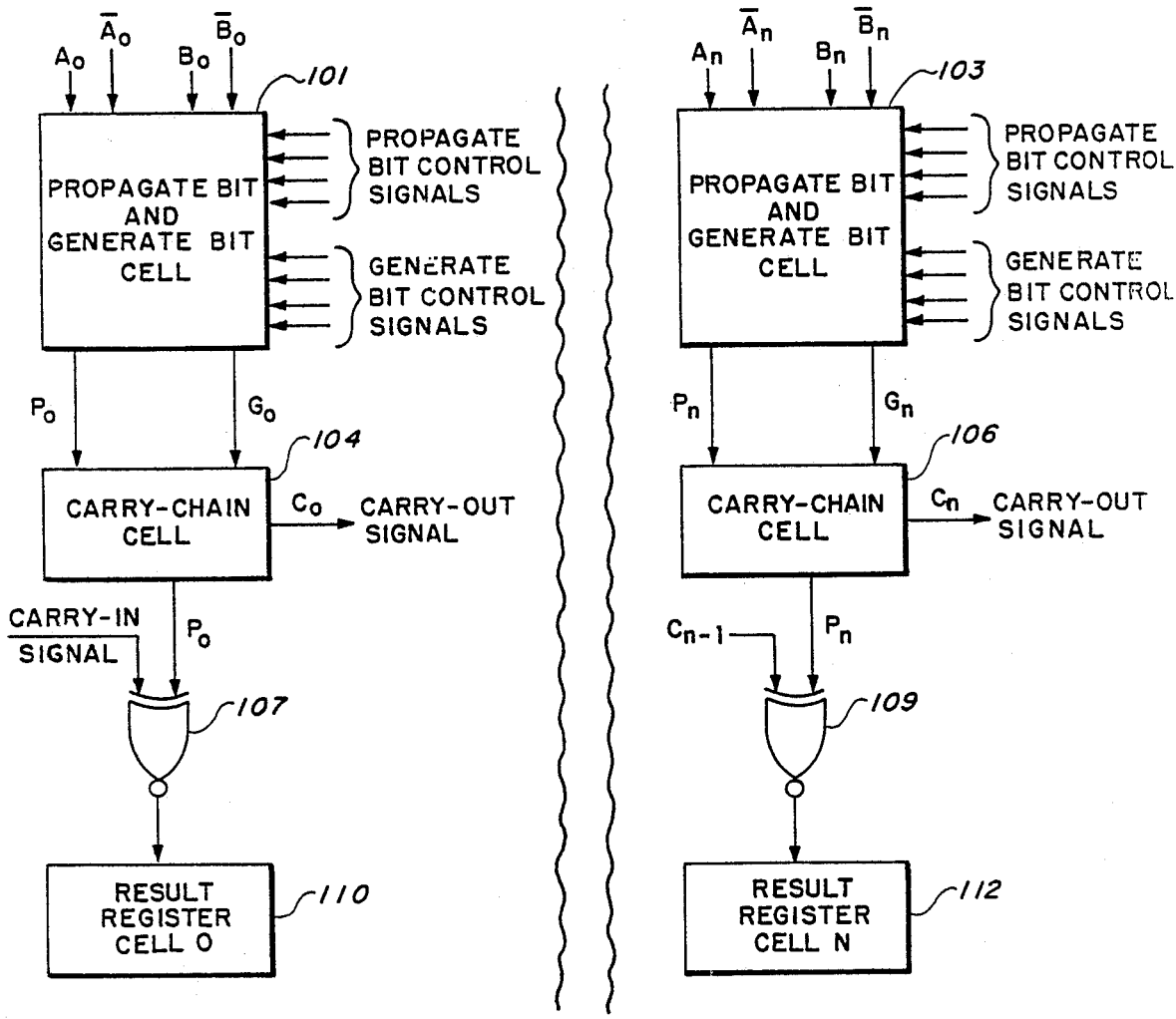
*FIG. IB.*

4,811,272

APPARATUS AND METHOD FOR AN EXTENDED ARITHMETIC LOGIC UNIT FOR EXPEDITING SELECTED FLOATING POINT OPERATIONS

BACKGROUND OF THE INVENTION

1. Field of the Invention

This invention relates generally to data processing systems and, more particularly, to the arithmetic logic unit (ALU) of a data processing system that performs the arithmetic and logical operations on groups of logic signals.

2. Description of the Related Art

In the central progressing unit of a data processing system, the arithmetic logic unit (ALU) provides the capability to perform a multiplicity of operations involving the logic signals stored in two registers. The operation of the arithmetic logic unit can generally be understood by reference to FIG. 1A and to FIG. 1B. In FIG. 1A, the input and output signals of one of the basic functional units of the arithmetic logic unit, the propagate bit and generate bit cell 10, also referred to hereinafter as the P and G cell 10, is shown. The P and G cell 10 receives input signals consisting of the signal from the $n^{th}$ cell position of register A, $A_n$; the logical complement of signal $A_n$, $A_n'$; the signal from the $n^{th}$ cell position of register B, $B_n$; and the logical complement of signal $B_n$, $B_n'$. The P and G cell 10 receives four propagate bit control signals and four generate bit control signals. The four propagate bit control signals control the combination of the $A_n$, $A_n'$, $B_n$ and $B_n'$ input signals to provide a $P_n$ (Propagate) bit. Similarly, the four generate bit control signals control the combination of the $A_n$, $A_n'$, $B_n$ and $B_n'$ input signals to provide a $G_n$ (generate bit signal. Referring next to FIG. 1B, a block diagram of an arithmetic logic uni incorporating a plurality of P and G cells 10 is shown. P and G cell 101 receives input signals from the $0^{th}$ register position and applies the $P_0$ and $G_0$ bits to the carry-chain cell 104. The carry-chain cell 104 provides a carry-out signal $C_0$. A carry-in signal and the propagate signal $P_0$ are applied to input terminals of the exclusive NOR logic gate 107. The output signal from gate 107 is applied to result register $0^{th}$ position 110. The carry-out signal $C_0$ is applied to one input terminal of exclusive NOR logic gate of the next sequential (i.e., next more significant) bit position. The arithmetic logic unit has a plurality of similarly coupled units for processing successive register position signals until the final unit in the sequence has P and G cell 103 receiving signals from the $N^{th}$ positions of register A and B. The P and C cell 103 applies the $P_N$ bit and the $G_N$ bit signals to the carry-chain cell 106. The carry-chain cell provides a carry-out signal $C_N$. The propagate signal $P_N$ and the carry-out signal $C_{N-1}$ from the previous (i.e., the next lesser significant) bit are applied to input terminals of th exclusive NOR logic gate 109. The output signal from the exclusive NOR logic gate 109 is applied to the result register $N^{th}$ position 112. The implementation of the arithmetic logic unit is well known to those skilled in the art. For example, Chapter 5 of "Introduction to VLSI Systems" by Caver Mead and Lynn Conway, Addison-Wesley Publishing Company (1980), describes the implementation of the Propagate bit and the Generate bit (referred to as the "Kill" bit) as well as the carry-chain cells in the M(etal)O(x-ide)S(emiconductor) technology.

One of the functions of the arithmetic logic unit is to determine the larger exponent of two operands in order to align the operands for floating point operations. The procedure by which the two exponents is determined is by performing the subtraction operations, [A(Exp. 1)−B(Exp. 2)] and [B(Exp. 2)−A(Exp. 1)]. The operation which provides the positive value indicates to the processor which exponent is larger and the alignment operations can proceed from that determination.

In the present state of the technology, two procedures exist for determining which of the exponents is larger;

1. The two subtractions can be performed serially on the operands of the exponents, for example [A−B] and then [B−A]. This technique uses the minimum amount of implementing electronic circuits, an important consideration in designing complex electronic components in which space can be severely limited. However, the minimum amount of implementing circuit topography is obtained at the cost of performance of the circuits, the procedure requiring two complete, sequential operations in the worst case.

2. The apparatus of the ALU performing the subtraction can be duplicated so that the [A−B] operation and the [B−A] operation can be performed simultaneously. As will be clear, the advantage of this technique is that the operation is performed twice as fast as the previous technique, but at the cost of twice as much implementing circuitry.

A need has therefore been felt for a technique that does not require the additional components required to duplicate the execution apparatus or does not require the time multiple passes through the execution apparatus to determine whether operand A or operand B is greater.

FEATURES OF THE INVENTION

It is an object of the present invention to provide an improved data processing system.

It is a feature of the present invention to provide apparatus for improved performance of floating point operations.

It is another feature of the present invention to provide apparatus for improved performance of floating point operations in a microprocessor.

It is a still further object of the present invention to provide an arithmetic logic unit that can perform the operation (A−B) and (B−A) simultaneously.

It is a more particular feature of the present invention to provide a propagate bit generate bit cell that can provide propagate bits and generate bits for $(A_n - B_n)$ and $(B_n - A_n)$ quantities simultaneously.

SUMMARY OF THE INVENTION

The aforementioned and other features are accomplished, according to the present invention, by providing an arithmetic logic unit that simultaneously determines the value of B−A and A−B and selects the appropriate result. The additional circuitry to perform this operation includes adding to the Propagate bit and Generate bit cell apparatus for determining an operand auxiliary Generate bit determined by reversing the operands of the subtraction operation in response to a predetermined control signal. The auxiliary Generate bit, along with carry-in signals and the Propagate bit are applied to a second carry-chain array. Selection apparatus determines whether the signals derived from the original or the second carry-chain array are entered into the result register. This technique has relatively minor impact on the execution time, the additional operations generally being performed in parallel.

These and other features of the present invention will be understood upon reading of the following description along with the drawings.

BRIEF DESCRIPTION OF THE DRAWINGS

FIG. 1A and FIG. 1B illustrate the operation of an arithmetic logic unit with reference to the related art.

DESCRIPTION OF THE PREFERRED EMBODIMENT

1. Detailed Description of the Figures

FIG. 1A and FIG. 1B have been described with respect to the related art.

Figure 2A:
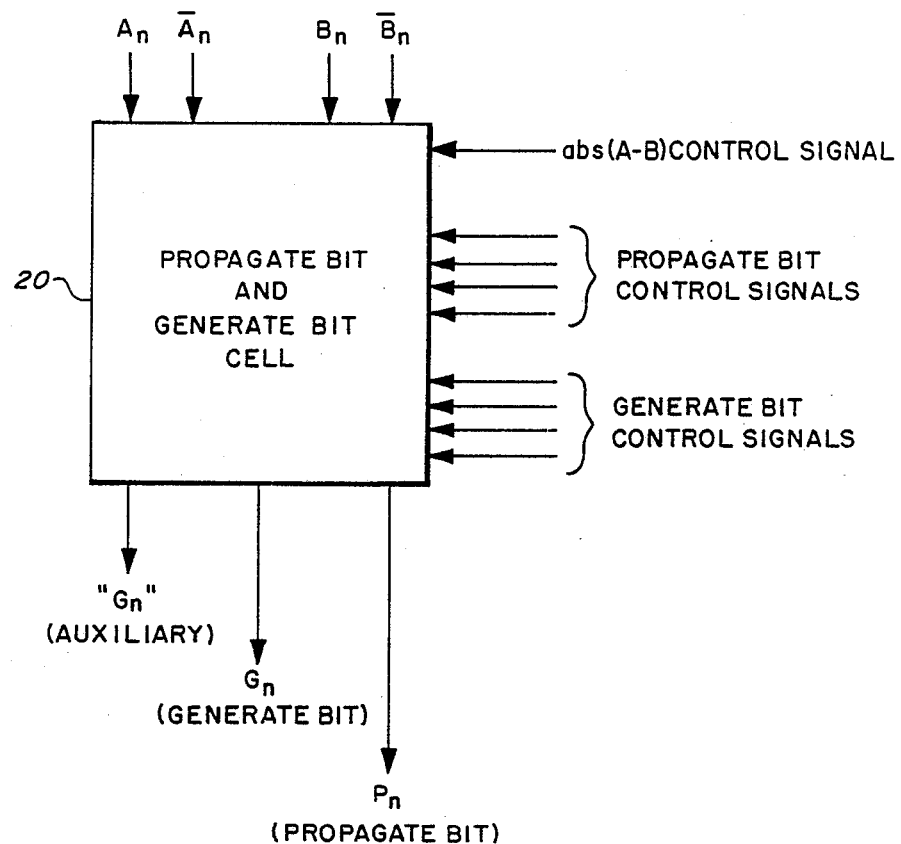
FIG. 2A and FIG. 2B illustrate the operation of the arithmetic logic unit according to the present invention.

Referring to FIG. 2A, the propagate bit and generate bit cell 20, according to the present invention, is shown. In addition to receiving four propagate bit control signals, four generate bit control signals, the $A_n$, $A_n'$, $B_n$ and $B_n'$ signals, the propagate bit and generate bit cell 20 receives a control signal designated abs(A−B). The propagate bit and generate bit cell 20, in addition to providing the G (generate) bit and the P (propagate) bit, also provides an auxiliary $G_n$ ("$G_n$") bit in response to the abs(A−B) control signal.

Figure 2B:
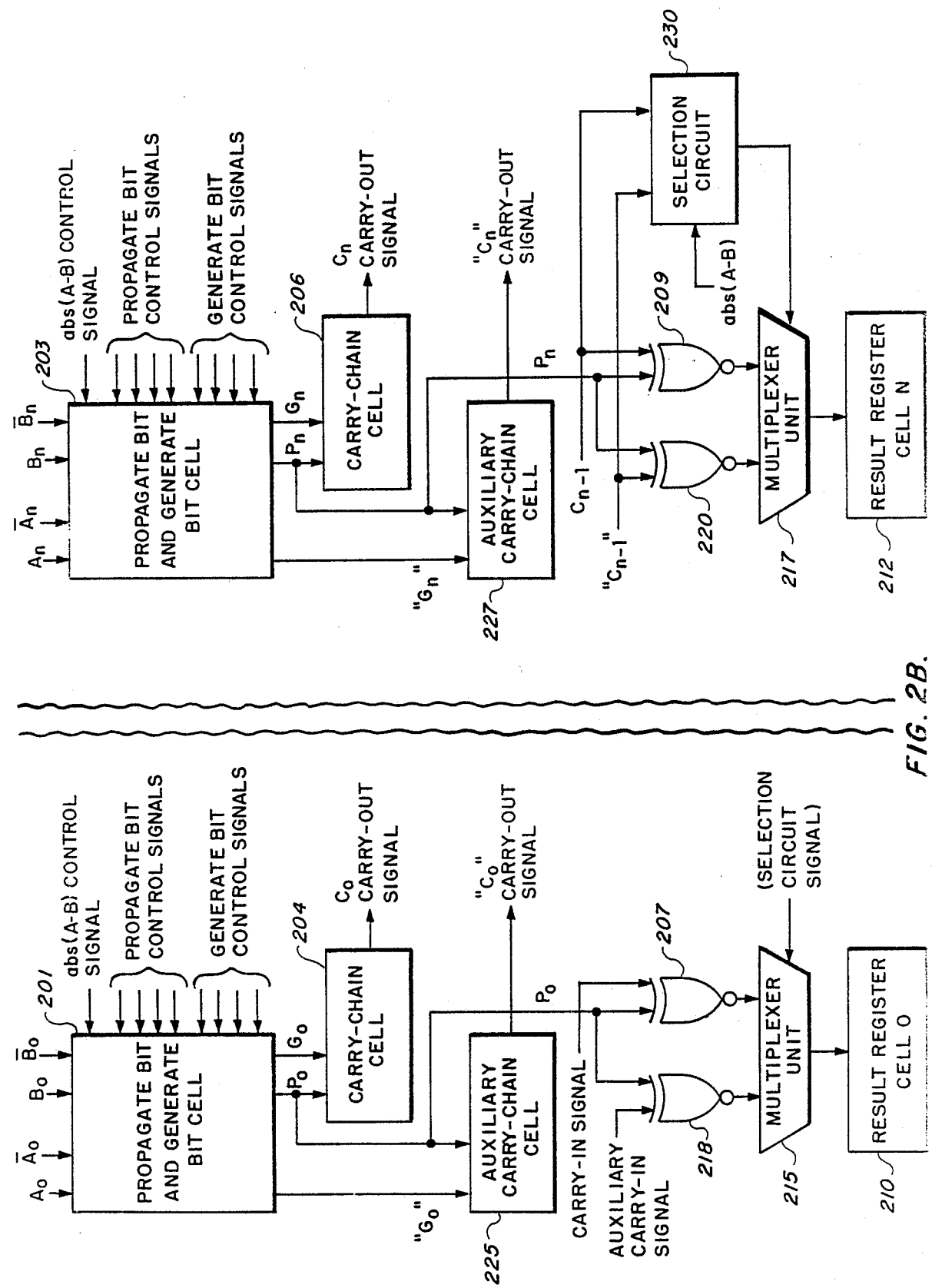

Referring to FIG. 2B, the block diagram of the arithmetic logic unit according to the present invention is illustrated. For each resister A and B position, a corresponding propagate bit and generate bit cell 201 through 203 is available to receive the logic signals (and complementary logic signals) from associated register positions. The output signals of the propagate bit and generate bit cells 201 through 203. $P_0$ through $P_n$ and $G_0$ through $G_n$, are applied to carry-chain cells 204 through 206 respectively. The carry-chain cells associated with bit positions 0 through n−1 apply carry-out signals, $C_0$ through $C_{n-1}$ to an input terminal of the exclusive NOR logic rate associated with the next successive (i.e., next more significant) bit position respectively, the carry-out signal $C_{n-1}$ being applied to an input terminal of exclusive NOR logic gate 109. The associated $P_n$ signal is also applied to an input terminal of the exclusive NOR logic gates 207-209 of the associated bit position. The "$G_n$" bit signal is applied along with the associated $P_n$ bit signal to an associated carry-chain cell 225 through 227. Each carry-chain cell 225 through 227 provides an associated auxiliary carry signal "$C_n$" that is applied to an input terminal of the exclusive NOR gate associated with the auxiliary carry-chain of the next successive (i.e., more significant) bit position. The exclusive NOR logic gates 218 through 220, associated with each bit position, have the $P_n$ signal associated with the bit position applied to a second input terminal of the exclusive NOR gate associated with each bit position. A multiplexer unit 215 through 217 selects output signals from exclusive NOR logic gate pairs 218 and 207 through 220 and 209, respectively, and applies the selected signal to an associated output register cell 210 through 212. The carry-out signal, $C_{n-1}$, from the most significant position−1 carry-chain cell and the carry-chain signal, "$C_{n-1}$", from the most significant bit position−1 auxiliary carry-chain cell are applied to selection circuit 230, selection circuit 230 controlling the selection of the multiplexer units 215 through 217. The selection circuit 230 is activated by the abs(A−B) signal. In the absence of the abs(A−B) signal, the output signals from exclusive NOR logic gates 207 through 209 are applied to the result registers 210 through 212.

Figure 3A:
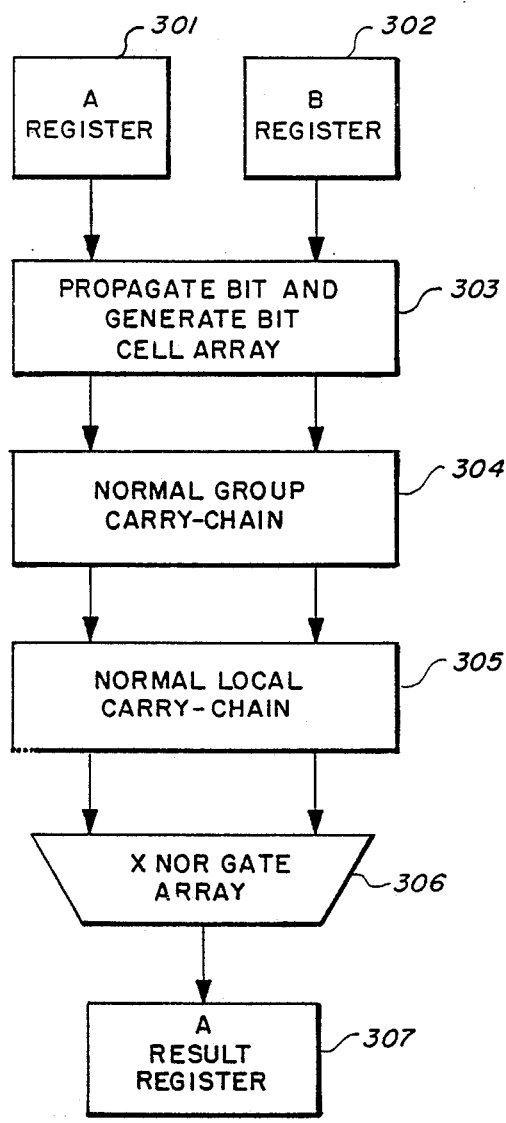
FIG. 3A and FIG. 3B are functional block diagrams illustrating the difference between the arithmetic logic unit of the prior art and the arithmetic logic unit of the present invention.
Figure 3B:
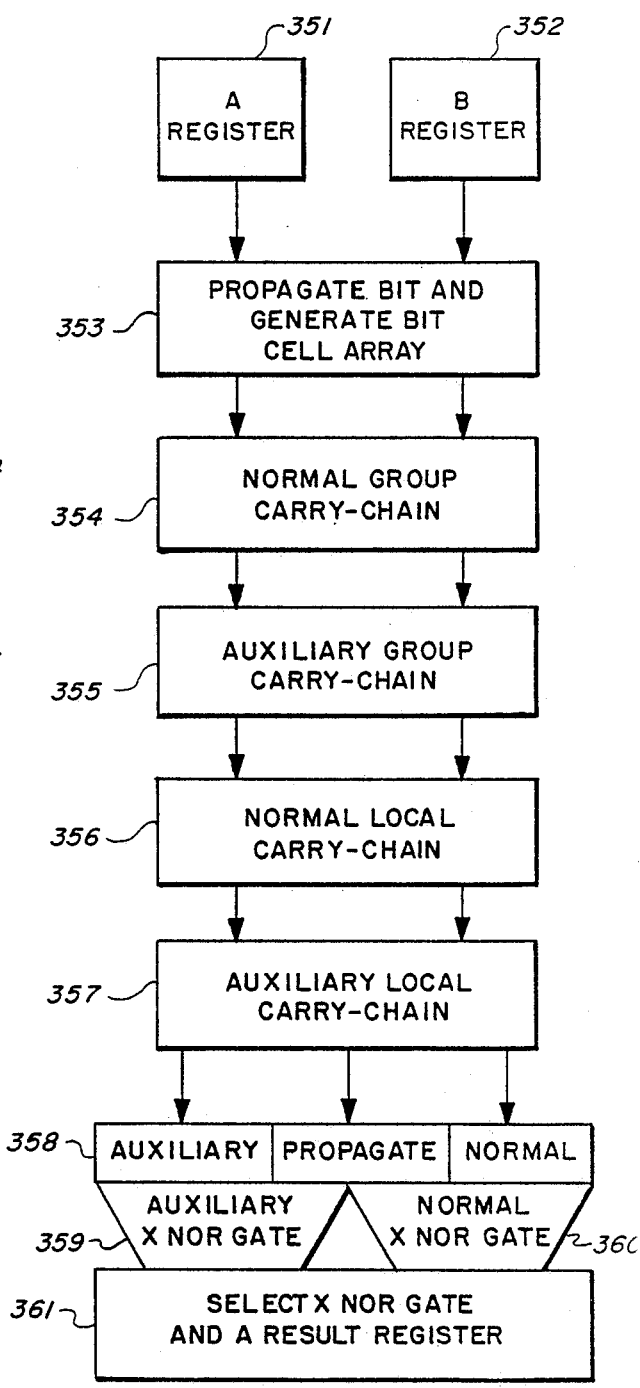

Referring to FIG. 3A and FIG. 3B, the operation of the arithmetic logic unit of the prior art is compared with the operation of the arithmetic unit of the present invention. Referring to FIG. 3A, the quantities to be combined by a logical operation are entered in the A register 301 and in the B register 302. These quantities are applied to the propagate bit and generate bit cell array 303. The output signals from the propagate bit and generate bit cell array 303 are applied to the normal group carry-chain 304. This apparatus (not described herein) provides a look-ahead function for the carry function in which the carry operation is determined for groups of signals. This apparatus is designed to eliminate the length of time for a ripple carry signal to be transmitted through the carry-chain. The normal local carry-chain 305 completes the operation begun by the normal group carry-chain 304 and selected signals are applied to the logic XNOR gate array 306. The output signals from the logic XNOR gate array 306 are entered in the A result register 307. Referring next to FIG. 3B, the functional block diagram of the present invention is illustrated. The signals in A register 351 and in B register 352, to be combined in a predetermined logical operation, are applied to the propagate bit and generate bit cell array 353. The output signals from the propagate bit and generate bit cell array are applied to the normal group carry-chain 354 (performing the look-ahead) function for the carry operation. Similarly, the auxiliary group carry-chain 355 receives signals from the propagate bit and generate bit cell array and performs the similar look-ahead function for the carry-chain implemented specifically to accommodate the new (auxiliary) signal created by the propagate bit and generate bit cell array of the present invention. The normal local carry operation is completed using normal local carry-chain 356 and the auxiliary auxiliary carry-chain operation is completed by auxiliary local carry-chain 357. The propagate signal and the auxiliary generate signal are applied to auxiliary logic XNOR gate array 359, while the propagate bit and the (normal) generate bit are applied to the normal XNOR gate array 306. The select XNOR gate and A result register determine which of the two sets of signals is selected for storage.

Figure 4:
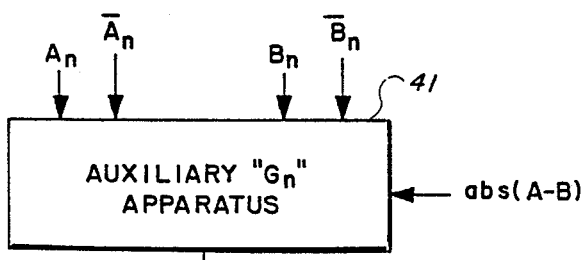
FIG. 4 illustrates the additional apparatus that is added to the propagate bit and generate bit cell to accomplish the present invention.

Referring next to FIG. 4, the additional functional apparatus required to be added to the propagate bit and generate bit cells 201 through 203 to implement the present invention is shown. The additional apparatus, designated auxiliary "$G_n$" apparatus can have available the same input signals $A_n$, $A_n'$, $B_n$ and $B_n'$. Additionally, one control signal the abs(A−B) control signal is applied to the auxiliary "$G_n$" apparatus 41 and an additional output signal "$G_n$" is available. As will be clear from the output signal of auxiliary "$G_n$" apparatus 41, because "$G_n$" = 1 only when $A_n$ and $B_n'$ are present, $A_n'$ and $B_n$ are redundant. The implementation can be provided by a transistor network of the type illustrated by FIG. 5.5, page 152, of Mead et al. cited previously.

2. Operation of the Preferred Embodiment

The Arithmetic Logic Unit (ALU) in a data processing system, and particularly in a microprocessor component of a data processing system, is used to process two data groups in response to control signals, typically generated by instructions, to obtain a result data group. The set of functions which the ALU is capable of executing includes addition, subtractions, negation and inversion. The ALU operates on the full width of an input operand and must provide apparatus, referred to as a carry-chain, to accommodate the effect of the operation on the most significant bit through the least significant bit. The number of data positions that the apparatus can accommodate in the carry chain determines the performance of the Arithmetic Logic Unit.

In the Very Large Scale Integration (VLSI) techniques, the selection of the function to be performed can be programmed, for example, by combining 2 sets of 4 control lines and two input data groups to produce a 2 bit function code, one propagate bit and one generate bit. This function code controls the operation of the carry-chain apparatus and controls the carry look-ahead circuitry (not shown). One bit of the function code, the propagate bit, and the result signal of the carry-chain cell associated with the next lessor significant bit position have the Exclusive-Nor (XNOR) logic function performed thereon to produce a result signal for the associated bit position.

In order to evaluate the $[A-B]$ and $[B-A]$ simultaneously, several economies in implementation can be used. For example, the propagate bit for $[A-B]$ and $[B-A]$ has the same control signals (cf. Table 5.2, page 174, Mead et al., cited previously) and therefore provides the same propagate bit result signal. Therefore, additional apparatus must be added only to provide the auxiliary generate bit, "$G_n$". However, this auxiliary "$G_n$" apparatus 41 is used only when the abs($A-B$) control signal is active. In this circumstance, the "$G_n$" bit will take the value of a logic "1" signal when $B_n=0$ and $A_n=1$ and will take the value of a logic 0 signal for all other input signal combinations. In the preferred embodiment, the auxiliary "$G_n$" apparatus is implemented by five transistors. However, with respect to the carry-chain cell array, the "$G_n$" bits must utilize a duplicated carry-chain cell array. Similarly, the XNOR logic gate array must be duplicated and the one of the output signals from the two XNOR logic gates associated with each bit position must be selected.

The decision between the result signal bits associated with the $[A-B]$ or the $[B-A]$ operation is determined by testing the most significant bit position$-1$ carry-out signals. Because subtraction of a larger quantity from a smaller quantity results in a negative number, the negative number can be identified by testing this position.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. An arithmetic logic unit comprising:

a plurality of logic means, each logic means receiving input signals from a preselected bit position of a first signal group and of a second signal group, each of said logic means responsive to control signals, each of said logic means including a first logic means responsive to said preselected bit position signals for providing a first logic signal, each of said logic means including a first and a second transfer means responsive to said preselected bit position signals for applying a first and a second transfer signal respectively to a next more significant bit position logic means, each of said logic means including a first combining means for providing a first output signal in response to said first logic signal and a first transfer signal from a next less significant bit position logic means and including a second combining means for providing a second output signal in response to said first logic signal and a second transfer signal from a next less significant bit position logic means; and selection means responsive to a selected first and second transfer signals for selecting a one of said first and said second output signals for each logic means.

2. The arithmetic logic unit of claim 1 wherein said first output signals are determined by subtracting said first signal group from said second signal group and wherein said second signal output signals are determined by subtracting said second signal group from said first signal group.

3. The arithmetic logic unit of claim 2 wherein a first control signal activates each of said logic means to provide said second output signals, said first control signal also activating said selection means.

4. The arithmetic logic unit of claim 3 wherein said first logic signal is a propagate bit, said first transfer signal being a carry-out bit and said second transfer signal being an auxiliary carry-out bit.

5. The arithmetic logic unit of claim 4 wherein each of said first transfer means includes a carry-chain cell responsive to a first generate bit and to said propagate bit for providing said first transfer signal, each of said second transfer means including an auxiliary carry-chain cell responsive to an auxiliary generate bit and to said propagate bit for providing said second transfer signal.

6. The arithmetic logic unit of claim 5 wherein said first combining means has a first exclusive NOR logic gate and said second combining means has a second exclusive NOR logic gate, wherein said first transfer signal is applied to a first input terminal of a first exclusive NOR logic gate of logic means related to a next more significant signal group bit position, a second input terminal of said first exclusive NOR logic gate having said propagate bit applied thereto, wherein said second transfer signal is applied to a first input terminal of a second exclusive NOR logic gate of said logic means related to said next more significant signal group bit position, a second input terminal of said second exclusive NOR logic gate having said second propagate bit applied thereto, output signals of said first and said second exclusive NOR gates being said first and said second output signals of each of said logic means.

7. An arithmetic logic unit having a first signal group and a second signal group applied thereto, said arithmetic logic unit determining an absolute value of the difference between said first signal group and said second signal group, said arithmetic logic unit comprising:

logic means responsive to a first plurality of control signals for providing a first difference signal group by subtracting said first signal group from said second group, said logic means responsive to a second control signal for providing a second difference signal group by subtracting said second signal group from said first signal group, wherein said logic means includes;

a plurality of P and G cells, each P and G cell coupled to a preselected bit position of said first and of said second signal group, each P and G cell providing a P signal and a G signal in response to said first plurality of control signals and preselected bit position signals from said first signal group and said second signal group, a plurality of G' cells, each of said G' cells providing a G' signal in response to said second control signal and preselected bit position signals from said first and said second signal groups;

a plurality of first carry-chain cells responsive to said P and G signals for determining a first carry signal used in determining said first difference signal group; and an auxiliary carry-chain responsive to said P and said G' signals for determining an auxiliary carry signal used in determining said second difference signal group;

a plurality for first combining means responsive to said P signal and a carry signal from a next less significant signal group bit position, output signals from said plurality of first combining means being said first difference signal group; and a plurality of auxiliary combining means responsive to said P signal and G' signal to a next less significant signal group bit position, output signals from said plurality of auxiliary combining means being said second difference signal group; and selection means for selecting a positive signal group of said first difference signal group and said second difference signal group.

8. The arithmetic logic unit of claim 7 wherein selection of said first difference signal group and said second difference signal group is determined by testing at least one of a selected first carry signal and a selected auxiliary carry signal by said selection means.

9. The arithmetic logic unit of claim 8 wherein said selected first carry signal and said selected auxiliary carry signal correspond to a most significant minus one bit position.

10. The arithmetic unit of claim 9 wherein carry signals associated with each bit position are applied to a first input terminal associated with a first exclusive NOR logic gate corresponding to a next more significant bit position, a second input terminal of said first exclusive NOR gate having a P signal of said next more significant bit position applied thereto, and wherein auxiliary carry signals associated with each bit position are applied to a first input terminal of a second exclusive NOR logic gate corresponding to said next more significant bit position, a second input terminal of said second exclusive NOR logic gate having said P signal of said next more important bit position applied thereto.

11. The arithmetic logic unit of claim 10 further including a multiplexer unit for selecting output signals corresponding to each bit position of said first and said second signal group, said multiplexer unit receiving output signals from said exclusive NOR logic gate and said second exclusive NOR logic gate corresponding to said each bit position, said multiplexer unit selecting a one of said output signals in response to selector means signals.

12. The arithmetic logic unit of claim 7 wherein a G' signal corresponding to a bit position has a first value only when said first signal group has a logic "0" signal and said second signal group has a logic "1" signal in said corresponding bit position.

13. The method of determining an absolute difference between signal group A and signal group B in an arithmetic logic unit, the method comprising the steps of:

in a propagate bit and generate bit cell corresponding to each bit position of said A and B signal groups for providing a P bit and a G bit for an (A−B) signal group determination, determining a G'(enerate) bit for a (B−A) signal group determination;

using said P bits and said G bits to provide carry signals; using said P bits and said G' bits to provide auxiliary carry signals;

combining each P bit with a preselected carry signal to form a (A−B) signal group;

selecting a positive signal group of said (A−B) signal group and said (B−A) signal group.

14. The method of determining an absolute difference between a signal group A and a signal group B of claim 13 further comprising the step of activating said determining step, said combining said auxiliary carry signal and said selecting step by a control signal when said absolute difference is required.

15. A propagate bit and generate bit cell for use in an arithmetic logic unit processing signal group A and signal group B, said cell comprising:

first means responsive to an $n^{th}$ member $A_n$ of said signal group A and an $n^{th}$ member $B_n$ of said B signal group and to a plurality of control signals for providing a propagate bit and a generate bit required for the determination of a $(B[n]−A[n])$ signal group; and second means responsive to a control signal and said $n^{th}$ member $A_n$ of said signal group A and said $n^{th}$ member $B_n$ of B signal group for providing a second generate bit required for determination of a $(A[n]−B[n])$ signal group.

16. The propagate bit and generate bit cell of claim 15 wherein said determination of a $(A_n−B_n)$ logic signal has a same propagate bit as determination of a $(B_n−A_n)$ logic signal.

17. The propagate bit and generate bit cell of claim 16 wherein said second generate bit has a first value when $A_n$ is a logic "0" signal and $B_n$ is a logic "1" signal and said second generate bit has a second value for other logic signals for $A_n$ and $B_n$.

* * * * *